United States Patent
van den Ouweland

[11] 3,853,918
[45] Dec. 10, 1974

[54] DIKETONES AND THEIR USE

[75] Inventor: Godefridus Antonius Maria van den Ouweland, Zevenaar, Netherlands

[73] Assignee: Lever Brothers Company, New York, N.Y.

[22] Filed: Dec. 13, 1971

[21] Appl. No.: 207,631

[30] Foreign Application Priority Data
Dec. 21, 1970 Great Britain .................. 60562/70

[52] U.S. Cl......... 260/347.2, 260/345.8, 260/345.9, 260/347.4, 260/347.8, 260/455 R, 260/483, 260/593 H, 260/594, 99/140 R
[51] Int. Cl.............................................. C07d 5/10
[58] Field of Search........... 260/347.2, 347.4, 347.8, 260/346.1 R

[56] References Cited
UNITED STATES PATENTS
3,694,466   9/1972   Buchi et al...................... 260/347.8

Primary Examiner—John D. Randolph
Assistant Examiner—Bernard Dentz
Attorney, Agent, or Firm—Lever Brothers Company

[57] ABSTRACT

Novel diketones of the structure

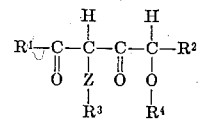

or a tautomeric form thereof in which $R^1$ and $R^2$ represent hydrogen or lower hydrocarbyl groups with the proviso that the number of carbon atoms of $R^1$ and $R^2$ taken together is from 1–4

$R^3$ represents a hydrogen, acyl or alkyl group containing 1–24 carbon atoms $R^4$ represents an alcohol protecting group resistant to alkali but removable under acid reaction conditions Z represents an oxygen or sulphur atom are claimed and a process for subjecting these diketones to ring closure conditions as to form a 2,3-dihydrofuran-3-one of the following structure

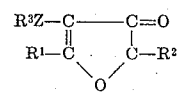

in which $R^1$, $R^2$, $R^3$ and Z indicate groups or atoms as indicated above.

7 Claims, No Drawings

DIKETONES AND THEIR USE

BACKGROUND OF THE INVENTION

1. Field of the Invention

The invention relates to the preparation of certain furan derivatives, in particular of certain substituted, 2,3-dihydrofuran-3-ones. More in particular the invention relates to the synthesis of compounds of the general formula:

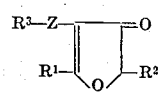

or tautomeric forms thereof, in which Z represents an oxygen or sulphur atom and $R^1$ and $R^2$ represent hydrogen or lower hydrocarbyl groups, preferably each an alkyl group, with the proviso that the number of carbon atoms of $R^1$ and $R^2$ taken together is between 1 and 4 and $R^3$ represents hydrogen, an acyl or alkyl group containing 1–24 carbon atoms, preferably from 1 to 8 carbon atoms, more in particular an alkyl group containing 1–4 carbon atoms.

Compounds satisfying this general formula are important flavouring agents or precursors therefor, which contribute to e.g. fruity and meaty flavours, dependent e.g. on their nature and concentration.

2. The Prior Art

Although diverse synthetic routes for several members of the groups of compounds satisfying the general formula have been suggested, none of these routes has been considered satisfactory for various reasons. Very frequently these syntheses employed relatively expensive starting materials or starting materials that are accessible only with difficulty, such as certain carbohydrates and derivatives thereof, and often reaction mixtures were obtained which contained appreciable amounts of undesirable byproducts which were difficult to remove, so that, consequently, the desired dihydrofuranone was only obtained in a relatively low yield.

SUMMARY OF THE INVENTION

According to the present invention to prepare the desired dihydrofuranones from starting materials which are easily accessible and consequently relatively cheap, and converting them into dihydrofuranones in good yields, avoiding the simultaneous formation of contaminants which are difficult to remove. Moreover this synthesis is applicable for the preparation of a series of dihydrofuranones and is therefore more versatile than those known in the art. Particularly good results can be achieved in the preparation of 2,5-dialkyl substituted furanones as e.g. the diemthyl compound.

DESCRIPTION OF THE INVENTION

According to the invention the desired dihydrofuranone is prepared by ring closure of a novel diketone of the general formula:

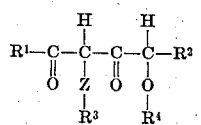

in which $R^1$ and $R^2$ represent a hydrogen atom or a lower aliphatic hydrocarbyl group preferably each an alkyl group in such a way that the number of carbon atoms of $R^1$ and $R^2$ taken together is between 1 and 4, whereas $R^3$ represents hydrogen or a lower acyl or alkyl group, containing 1–24, preferably 1–8, carbon atoms, more in particular an alkyl group containing 1–4 carbon atoms, Z represents an oxygen or a sulphur atom, $R^4$ represents such a group that $-OR^4$ constitutes an alcohol protective group, which is resistant to alkali but which can be removed under acid conditions so that $R^4$ preferably represents a $C_1$–$C_{20}$ alkyl group, as e.g. derived from methanol, ethanol, butanol, isopropanol, isobutanol, isopentanol, triphenyl carbinol, tertiary butanol, tertiary pentanol, tertiary hexanol and higher homologues thereof, or $-OR^4$ may represent a mixed acetal group, such as a tetrahydrofuranyl group, a tetrahydropyranyl group an alpha-substituted methyl-ethyl ether or an alpha- or beta-unsaturated ether group, such as an allyl ether group, benzyl ether group or a meta- or para-methoxy phenyl group.

Diketones of the structure indicated above may show keto-enol tautomerism and may occur in an enol form and the invention also comprises subjecting these compounds to ring closure. There are e.g. experimental indications that the keto-enol tautomerism equilibrium is more shifted towards one of the enols under specific conditions.

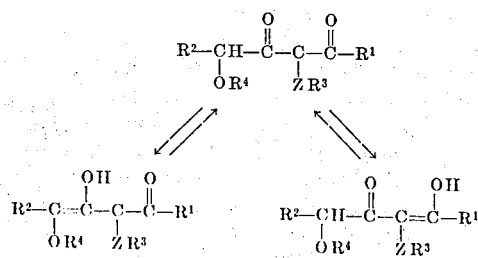

and the invention thus also comprises subjecting these enol forms or mixtures to ring closure in such a way that the desired compound is formed.

The ring closure reaction can be carried out in a wide range of solvents such as water, organic solvents as e.g. hydrocarbons, halogenated hydrocarbons, carboxylic acids, ethers or alcohols dependent on the ring closure catalyst used. Preferred solvents are tetrachloromethane, dichloromethane, diethyl ether, tetrahydrofuran, dioxane, benzene, toluene, pentane, water, methanol, ethanol, butanol or chloroform.

The ring closure reaction is usually carried out in the presence of a ring closure catalyst e.g. a lower aliphatic mono- or polycarboxylic acid containing up to 8, preferably 4 carbon atoms; an acid reacting ion exchange resin, an inorganic acid and acids in general according to the definition of G. N. Lewis, including aprotic acids, may also be used. Acetic acid, oxalic acid, citric acid, chloroacetic acid, hydrochloric acid, sulphuric acid, borontrifluoride, zinc chloride and stannous chloride are preferred ring closure catalysts. Some of the solvents mentioned above as e.g. carboxylic acids do already act as catalysts. In case it is desired to prepare dihydrofuran-3-ones carrying a thio or thioester group at carbon atom 4, represented by $ZR^3$, the ring closure is conveniently effected by means of an organic thioacid.

The amount of ring closure catalyst employed may vary widely dependent on the nature of the catalyst and the prevailing reaction conditions. In some cases catalytic amounts of 0.01% w.w. calculated on diketone may be sufficient (e.g. hydrochloric acid) and in other cases an equimolar quantity may be desirable (lower aliphatic (thio) carboxylic acids). In general 0.001% w.w. several times w.w. calculated on the diketone of catalyst can be used.

The ring closure may conveniently be effected in 0.5N aqueous hydrochloric acid at reflux temperature and the reaction may take 30 min. In general reaction temperatures may vary from −30° to 150°C, also dependent on whether the free hydroxy compound or an ester is aimed at, and the reaction time from several, say 2 minutes to a few, say 6 hours; a time of 10–40 minutes at reflux temperature is preferred. The reaction product comprises the 4-hydroxy or 4-thiol compound together with its ester or ether. Further reaction with the acid may cause more complete saponification. Usually the reaction is carried out at atmospheric pressure but sub- or superatmospheric pressures may be employed.

As the ring closure reaction of the diketone to the dihydrofuran-3-one proceeds already under mild reaction conditions, this conversion may be effected in the food-stuffs as e.g. baking and frying fats during use, so that the novel diketones can successfully be incorporated in such foodstuffs during their manufacture.

The diketone derivatives of the general formula mentioned above are conveniently prepared from certain halogeno compounds by reacting them with carboxylate or thiocarboxylate ions derived from (thio) carboxylic acids of the structure $R^3ZH$, in which $R^3$ represents an acyl group as defined above. The carboxylate ions are conveniently obtained by dissolving the salts, in particular the alkali salts of the acids concerned in the appropriate solvent. Usually the carboxylate is used in 0.5–5 molar quantities calculated on the halogen compound, preferably between 1 and 2 molar quantities.

Halogeno compounds which are conveniently converted may have the following general formula, but other stereoisomeric or tautomeric forms thereof may also be converted.

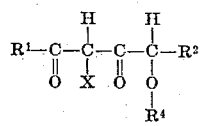

In this formula X represents a halogen atom such as chlorine, bromine or iodine, preferably one of the former two atoms.

The substitution reaction of —X by —OR³ may in general be conducted in an organic polar solvent, e.g. methanol, ethanol, acetic acid, and preferably in dipolar aprotic solvents, such as dimethylformamide, dimethylsulfoxide, acetonitrile, acetone and the like. A description of this group of aprotic solvents is given in "Advances in Organic Chemistry", vol. 5, pp. 1–46, 1965, by A. J. Parker.

The reaction temperature and time can be varied widely, usually above 0°C, and range normally from 20°–100°C and from 10 minutes to a few hours. In the substitution of X by —SR³ as well as in the cyclization reaction the same solvent is used as in the preparation of the halogeno compound, which avoids the need to remove the solvent between the different reaction steps.

Consequently, it is an object of the invention to treat the halogeno compound with a free thiocarboxylic acid as e.g. thioacetic acid, in which process several reaction steps are carried out in one operation (one vessel reaction). The amount of free thioacid used is usually a molar excess calculated on the halogeno compound; generally up to 50 molar percent excess is beneficial. Larger amounts, although their use has no advantages, may however also be employed. It is preferred to add the thioacid dropwise to the dissolved halogeno compound.

The halogeno compound is in turn conveniently prepared by reacting a compound of the general formula, (but other stereoisomeric or tautomeric forms thereof may also be converted) with free halogen,

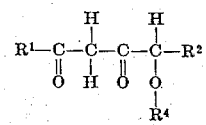

as e.g. bubbling chlorine or bromine through a solution of the compound, or a halogenating agent as e.g. N-bromo- or chlorosuccinimide or the corresponding phthalimides.

The introduction of the halogen atom is preferably carried out in an inert solvent like hydrocarbons, such as cyclohexane, benzene; halogenated hydrocarbons, such as chloroform, tetrachloromethane, furthermore in acetonitrile, nitromethane, dimethylformamide, dimethylsulphoxide. The reaction temperature during the halogenation usually is above −30°C, preferably between 0° and 100°C in case free halogen is used, preferably from −30° to +10°C; with the imides between 20° and 80°C. In general, to avoid the introduction of more than one halogen atom, no more than molar quantities of halogen are introduced into the reaction mixture. It is not necessary to purify the reaction mixture containing the halogeno compound, but usually it is desirable, in connection with the reaction with the carboxylate ion, to replace the solvent in which it is dissolved, by a dipolar aprotic solvent, which in some cases may be effected by addition of such a less volatile dipolar aprotic solvent and evaporating off the more volatile first solvent, occurring in the original reaction mixture.

It is not necessary to isolate the halogeno compound and in an embodiment of the invention the beta diketone is halogenated in the presence of a carboxylate ion, so that the halogeno compound is immediately converted into an alpha-acyloxy-beta-diketone which may or may not be isolated before ring closure is effected to yield the substituted dihydrofuran-3-one.

The non-halogenated compounds are conveniently prepared, e.g. by coupling simple starting materials as follows:

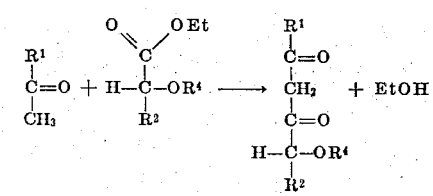

in which Et represents an ethyl group or another lower alkyl group. The reaction is catalyzed by bases and in order to avoid polymerization of the starting material it is preferred that R¹ represents an alkyl group rather than a hydrogen atom, so that acetone or a higher alkylmethyl ketone is coupled with an alpha-hydroxy carboxylic acid ester, with a protected hydroxyl group, e.g. an ether group.

The non-halogenated compounds of the general formula mentioned above, in which R¹ represents hydrogen, are conveniently prepared via another route, viz. by coupling

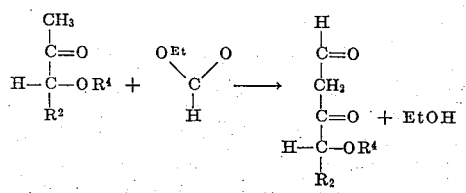

The following examples illustrate the invention.

EXAMPLE 1

Preparation of 4-thioacetoxy-2,5-dimethyl-2,3-dihydrofuran-3-one

To a suspension of 27.0 g (0.5 moles) of sodium methoxide in 250 ml of dry ether was added and in the course of 1 hour a mixture of 29.0 g (0.5 moles) of acetone and 50.5 g (0.25 moles) of pyranylether of ethyllactate (b.p. 63°C at 0.1 mm Hg), prepared from ethyllactate and dihydropyran according to the procedure described by D. N. Robertson J.Org.Chem., 25, 931 (1960).

During the addition the temperature of the mixture raised to reflux temperature (35°) and the colour of the mixture turned to a reddish brown. Stirring was continued after completing the addition for another 20 minutes in order to complete the formation of 2-tetrahydro-pyranyl oxy -3,5-hexanedione. After acidification with an aqueous solution of 29.5 g (0.55 moles) of ammoniumchloride (cooling required), the organic layer was washed, dried over anhydrous sodiumsulfate and evaporated to dryness. Distillation of the residue gave 35 g (65%) of 2-tetrahydropyranyl oxy -3,5-hexanedione (b.p. 77°–79°C/0.2 mm Hg, $n_D^{20}$ = 1.4772).

A stirred solution of 21.4 g (0.1 mole) of the above-prepared diketone and 23.7 g (0.3 moles) of pyridine in 80 ml of dry tetra-chloromethane was chilled in an ice-bath to approximately 10°C. Then in 30 minutes, 7.1 g (0.1 mole) of chlorine was introduced into the reaction mixture and stirring was continued for another 30 minutes to complete the formation of 4-chloro-2-tetrahydropyranyloxy-3,5-hexanedione, which structure was confirmed by nuclear magnetic resonance infrared and mass-spectroscopy.

Infrared absorption characteristics: maxima at (in CCl₄) 2945, 2870, 2850, 1747, 1722 (broad), 1600 (broad, weak), 1452, 1440, 1355, 1200, 1125, 1075, 1032, 966, 871 cm⁻¹.

The mass-spectrum showed peaks with decreasing intensity by m/e 85, 43, 41, 57, 55, 67, 86, 56, 119, 92.
NMR data (solution in CCl₄ with trimethylsilane as an internal standard)

| | | |
|---|---|---|
| $\delta$=1.32 p.p.m. doublet<br>$\delta$=1.35 p.p.m. doublet<br>$\delta$=1.40 p.p.m. doublet<br>$\delta$=1.46 p.p.m. doublet | Indicating |  |
| $\delta$=1.60 p.p.m. broad singlet | Indicating | 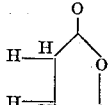 |
| $\delta$=2.34 p.p.m. singlet<br>$\delta$=2.37 p.p.m. singlet | Indicating |  |
| $\delta$=3.1–4.0 p.p.m. multiplet | Indicating |  |
| $\delta$=4.24 p.p.m. quartet<br>$\delta$=4.29 p.p.m. quartet | Indicating |  |
| $\delta$=4.5–4.8 p.p.m. multiplet | Indicating |  |
| $\delta$=5.03 p.p.m. singlet<br>$\delta$=5.06 p.p.m. singlet<br>$\delta$=5.25 p.p.m. singlet<br>$\delta$=5.32 p.p.m. singlet | Indicating |  |

To the reaction mixture were then added dropwise, with stirring and cooling to approximately 15°C, 9.12 g (0.12 moles) of thioacetic acid. Upon completion of addition the reaction mixture was stirred overnight at room temperature and filtered, and the filtrate was taken up in ether, washed, dried and evaporated. Distillation of the residue yielded 11.2 g (60% calculated on 2-tetrahydropyranyloxy-3,5-hexanedione) of 4-thioacetoxy-2,5-dimethyl-2,3-dihydrofuran-3-one with b.p. 63°–65°C/0.05 mm Hg, $n_D^{20}$ = 1.5297.

Infrared absorption characteristics: maxima at (in CCl₄): 2990, 2930, 1720 (shoulder), 1705, 1590, 1440, 1421, 1390, 1371, 1345, 1283, 1163, 1105, 1058, 1035, 985, 947, 615, 605, cm⁻¹. Mass data m/e 186 (mol.ion), 144, 115, 111, 102, 101, 71, 43.

| N.M.R.<br>in CCl₄ | $\delta$= | 1.46 ppm doublet (indicating —CH₃ on 2—position)<br>2.20 ppm broadened singlet (indicating —CH₃ on 5-position)<br>2.32 ppm singlet (indicating —CH₃ of acetyl group)<br>4.51 ppm broadened quartet (indicating H— on 2-position) |
|---|---|---|

EXAMPLE 2

Preparation of 4-thioacetoxy-5-methyl-2,3-dihydrofuran-3-one

To a suspension of 27.0 g (0.5 moles) of sodium methoxide in 250 ml of dry ether were added with stirring 72 g (0.33 mole) of the pyranyl ether of n-butyl glycolate (b.p. 80°C at 0.1 mm Hg, $n_D^{20} = 1.4438$). Acetone (29 g, 0.5 mole) was then added dropwise to the mixture at such a rate as to maintain the temperature at gentle reflux. Finally a light tan solution was obtained after completion of the addition. The solution was stirred for another 15 minutes at 30°–35°C and poured out onto a mixture of 60 g of concentrated hydrochloric acid and 300 g of ice. The ether layer was separated off and the water layer extracted twice with 100 ml of ether. The combined ether extracts were washed with water, dried over anhydrous sodium sulphate and the solvent evaporated off. The residue was fractionated using a 30 cm Vigreux column, yielding 43 g (65% calculated on pyranyl ether of butylglycolate) of 1-tetrahydropyranyloxy-2,4-pentanedione, b.p. 90°C at 0.3 mm Hg, $n_D^{20} = 1.4807$.

Into a stirred solution of 37 g (0.185 mol) of the above-prepared pentanedione and 48 g (0.6 mol) of pyridine in 160 ml of dry tetrachloromethane at 10°–15°C was introduced in the course of 30 min: 14.2 g (0.2 mol) of chlorine. The formation of the corresponding 4-chloro compound was established by infrared and mass spectrometry as follows:

Infrared adsorption characteristics: maxima at (in $CCl_4$): 2940, 2870, 2850, 1720 (broad), 1605 (broad), 1353, 1199, 1127, 1075, 1034, 962, 903, 868 $cm^{-1}$.

The mass spectrum showed peaks with decreasing intensities at m/e: 85, 43, 41, 57, 55, 67, 101, 56, 86, 84.

After an additional stirring period of 1 hour, 18.24 g (0.24 mol) of thioacetic acid was added during 15 min while the temperature of the reaction mixture was kept below 20°C by means of an ice-bath. After standing overnight at room temperature the reaction mixture was filtered and the filtrate diluted with 500 ml of ether. The ethereal solution was washed and dried, and solvent was removed at 35°C under reduced pressure. To complete the cyclization of the crude 1-tetrahydropyranyloxy-3-thioacetoxy-2,4-pentanedione the residue was dissolved in 200 ml of methanol and refluxed with 0.5 g of p-toluenesulfonicacid for one hour. After working up the reaction mixture, the product was isolated by columnchromatography over silicagel and elution with light petroleum ether (3:1). Infrared absorption characteristics of the title compound are maxima at (in $CCl_4$): 2940, 1720 (broad), 1597, 1420, 1387, 1350, 1337, 1293, 1153, 1110, 1015, 945, 914, 686, 633, 620, 605 $cm^{-1}$. Mass data m/e 172 (mol.ion), 130, 101, 88, 87, 85, 71, 45, 43, 42.

$\delta = 2.28$ ppm broadened singlet (indicating $-CH_3$ on 5-position)
NMR in $CDCl_3$
$\delta = 2.40$ ppm singlet (indicating $-CH_3$ of acetyl group)
$\delta = 4.68$ ppm broadened singlet (indicating protons on 2-position
(Trimethylsilane as an internal standard)

Trimethylsilane was again used as an internal standard.

EXAMPLE 3

Preparation of 4-hydroxy-2,5-dimethyl-2,3-dihydrofuran-3-one

To a solution of 21.4 g (0.1 mole) of 2-tetrahydropyranyloxy-3,5-hexanedione (obtained as described in Example 1) in 100 ml of dry tetrachloromethane was added 17.8 g (0.1 mole) of N-bromosuccinimide; after a few seconds the exothermic reaction started and the temperature of the reaction rose to 76°C. Stirring was continued for another 15 minutes and the reaction mixture was cooled and filtered, and the filtrate evaporated in a water-jet vacuum at room temperature. The 4-bromo-2-tetrahydropyranyl oxy -3,5-hexanedione thus obtained was identified by infrared, NMR and mass spectrometry as follows:

Infrared adsorption characteristics: maxima at (in $CCl_4$) 2940, 2850, 1747, 1718 (broad), 1452, 1440, 1354, 1200, 1123, 1074, 1033, 972, 870 $cm^{-1}$. Mass spectral data: peaks at m/e 85, 43, 41, 57, 55, 67, 86, 45, 71, 129. NMR ($CCl_4$ solution with trimethylsilane as internal standard)

| | |
|---|---|
| $\delta=1.31$ p.p.m. doublet<br>$\delta=1.37$ p.p.m. doublet<br>$\delta=1.41$ p.p.m. doublet<br>$\delta=1.45$ p.p.m. doublet | $H_3C-\overset{O-}{\underset{H}{C}}-$ |
| $\delta=1.60$ p.p.m. broad singlet | (tetrahydropyranyl ring) |
| $\delta=2.32$ p.p.m. singlet<br>$\delta=2.45$ p.p.m. singlet | $H_3C-\overset{O}{\underset{}{C}}-$ |
| $\delta=3.1-4.0$ p.p.m. multiplet | (pyranyl ring with H) |
| $\delta=4.15$ p.p.m. quartet<br>$\delta=4.21$ p.p.m. quartet<br>$\delta=4.27$ p.p.m. quartet<br>$\delta=4.32$ p.p.m. quartet | $H_3C-\overset{O-}{\underset{H}{C}}-$ |
| $\delta=4.4-4.8$ p.p.m. multiplet | $\overset{|}{\underset{O}{O}}\overset{H}{\diagup}$ |
| $\delta=5.11$ p.p.m. singlet<br>$\delta=5.13$ p.p.m. singlet<br>$\delta=5.30$ p.p.m. singlet<br>$\delta=5.41$ p.p.m. singlet | $-\overset{O}{\underset{}{C}}-\overset{Br}{\underset{H}{C}}-\overset{O}{\underset{}{C}}-$ |

The evaporated filtrate was used in the next step without further purification and dissolved in 100 ml of dimethylformamide. 19.6 g (0.2 mole) of potassium acetate were then added to the solution and the mixture was stirred for 30 minutes at 35°–40°C. After this stirring period the mixture was filtered and the filtrate concentrated under reduced pressure. 4-acetoxy-2-tetrahydropyranyloxy-3,5-hexanedion could be isolated by short path distillation (b.p. 116°–118°C/0.1 mm Hg). The infrared spectrum of the liquid substance shows absorption peaks at 2940, 2870, 1756, 1740, 1725, 1440, 1370, 1230, 1126, 1075, 1033, 976, 901, 871, 615 cm$^{-1}$. The mass spectrum shows peaks with decreasing intensities at m/e 85, 43, 116, 57, 41, 55, 74, 129, 67, 200. NMR spectrum (trimethylsilane used as internal standard in CCl$_4$ solution):

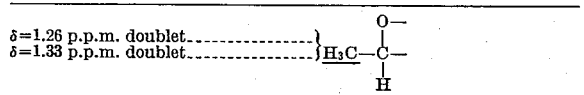

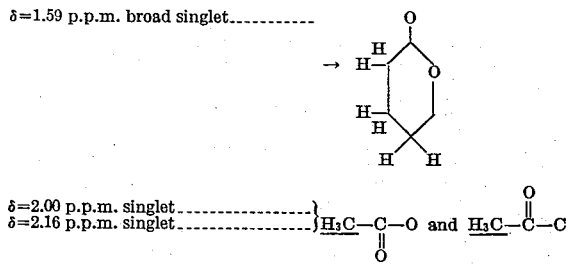

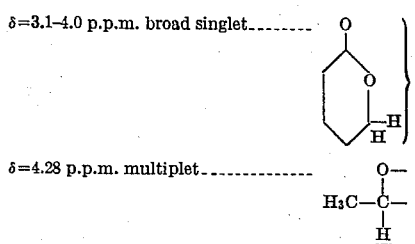

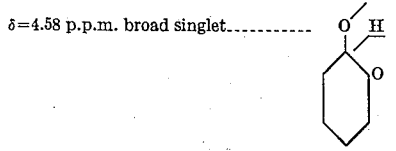

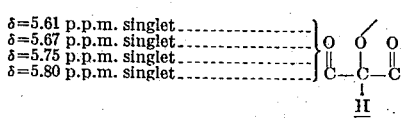

The 4-acetoxy-2-tetrahydropyranyloxy-3,5-hexanedione was dissolved in 200 ml of a 0.5N HCl solution and refluxed for 1 hour, cooled to 30°C and continuously extracted with ether for 18 hours. The ether extract was dried and evaporated and the residue was crystallised from ether-light petroleum. After standing overnight in the refrigerator the crystals were collected by filtration (3.8 g, 30% yield calculated on 2-tetrahydropyranyloxy-3,5-hexanedione), mp. 78°–80°C, and proved to be GLC pure 4-hydroxy-2,5-dimethyl-2,3-dihydrofuran-3-one.

EXAMPLES 4–9

Effect of solvents on the preparation of 4-hydroxy-2,5-dimethyl-2,3-dihydrofuranone and the corresponding 4-acetoxy compound The process as described in Example 3 was repeated, now using, however, different solvents for the reaction with potassium acetate and the subsequent substitution. Evaporating off the tetrachloromethane from the brominated product was conducted and 100 ml of a dipolar aprotic solvent was introduced. After which the various operations described in the previous example were carried out with some modifications in the reaction time as indicated below. The yields of 4-hydroxy-2,5-dimethyl-2,3-dihydrofuran-3-one (2,5-dimethylfurenidone) and the corresponding 4-acetoxy compound in the reaction mixture were determined by a gaschromatographic method using ntetradecanol as an internal standard. The results are tabulated below:

| Ex. | Solvent | Reaction time + temp. | Yield calculated on starting diketone (percentage of theory) | |
|---|---|---|---|---|
| | | | 4-hydroxy furenidone | 4-acetoxy furenidone |
| 4 | Acetone | 7 h 56°C (reflux) | 27 | 3 |
| 5 | Acetonitrile | 10 min. 82°C (") | 29 | 1 |
| 6 | Dimethylsulfoxide | 45 min. 20°C | 24 | 3 |
| 7 | NN-dimethylformamide | 30 min. 40–45°C | 30 | 1 |
| 8 | Acetic acid | 45 min. 80°C | 39 | 1 |
| 9 | Methanol | 30 min. 68°C | 16 | 4 |

EXAMPLES 10–21

Effect of variation in the ring closure conditions in the preparation of 4-hydroxy-2,5-dimethyl-2,3-dihydrofuran-3-one and the corresponding 4-acetoxy compound 4-acetoxy-2-tetrahydropyranyloxy-3,5-hexanedione was prepared as described in Example 3 and ring closure reaction of a sample was subsequently carried out under various conditions as tabulated below. The yields of the 4-hydroxy and 4-acetoxy furenidones were determined as described in Examples 4–9, calculated as a percentage based on the starting diketone.

| Ex. | Ring closure catalyst and solvent | Reaction | | Yield of | |
|---|---|---|---|---|---|
| | | time | temp. | 4-hydroxy-furenidone | 4-acetoxy-furenidone |
| 10 | 20 vol.pts N HCl | 20 h | 20°C | 42 | 1 |
| 11 | 20 vol.pts 0.025 N HCl | 92 h | 20°C | 22 | 10 |
| 12 | 20 vol.pts 0.05 N HCl | 30 min. | 100°C | 26 | 14 |
| 13 | 20 vol.pts 0.25 N HCl | 45 min. | 80°C | 35 | 4 |
| 14 | 20 vol.pts 0.5 N HCl | 30 min. | 100°C | 23 | 1–2 |
| 15 | 20 vol.pts 3 N HCl | 30 min. | 100°C | 9 | 0 |
| 16 | 20 vol.pts H$_2$O + 0.5% w.w. acetic acid | 5½ h | 100°C | 30 | 9 |

| Ex. | Ring closure catalyst and solvent | Reaction time | temp. | Yield of 4-hydroxy-furenidone | Yield of 4-acetoxy-furenidone |
| --- | --- | --- | --- | --- | --- |
| 17 | 30 vol.pts H₂O + 2 pts ion exchange resin Biorad Biorad AG-50W-X8 | 20 min. | 100°C | 32 | 5 |
| 18 | 10 vol.pts diethylether + 0.1 pt BF₃.2C₂H₅OC₂H₅ | 15 min. | 20°C | 0 | 12 |
| 19 | 20 vol.pts benzene + 0.1 pt BF₃.2C₂H₅OC₂H₅ | 10 min. | 80°C | 6–7 | 19 |
| 20 | 20 vol.pts benzene + 0.1% w.w. paratoluene sulphonic acid | 1 h | 80°C | 0 | 25 |
| 21 | 10 vol.pts chloroform + 0.1% w.w. dry hydrochloric acid | 10 min. | 20°C | 38 | 5 |

EXAMPLES 22–27

Effect of variation of the reaction conditions in the replacement of the halogen atom by a carboxylate group In these experiments a bromoderivative was prepared as described in Example 3, which was then reacted with carboxylates in dimethylformamide under various conditions as tabulated below, after which cyclization took place as described in Example 4. The amount of 4-hydroxyfurenidone was determined as described in Example 4.

| Ex. | Quantity of carboxylate | Carboxylate used | Yield of 4-hydroxyfurenidone |
| --- | --- | --- | --- |
| 4 | 2 eq | Potassium acetate | 27% |
| 22 | 1 eq | Potassium acetate | 24% |
| 23 | 5 eq | Potassium acetate | 26% |
| 24 | 2 eq | Potassium formate | 15% |
| 25 | 2 eq | Sodium acetate | 46% |
| 26 | 2 eq | Barium acetate | 13% |
| 27 | 2 eq | Potassium carbonate | 5% |

Similar results could be obtained with potassium butyrate or hexanoate.

EXAMPLE 28

Preparation of 4-hydroxy-5-methyl-2,3-dihydrofuran-3-one

To a solution of 20 g (0.1 mol) of 1-tetrahydropyranyloxy-2,4-pentanedione (prepared as described above) in 100 ml of dry tetrachloromethane was added 17.8 g (0.1 mol) of N-bromosuccinimide and the mixture was stirred for 10 minutes at 70°C. Then the reaction mixture was filtered and the solvent removed from the filtrate by evaporation in a water-jet vacuum. The mass spectrum of the 3-bromo-1-tetrahydropyranyloxy-2,4-pentanedione showed peaks with decreasing intensities at m/e 85, 43, 41, 57, 55, 56, 67, 101, 86, 84.

Infrared absorption characteristics: maxima at (in CCl₄) 2940, 2870, 2850, 1746, 1718 (broad), 1600 (broad, weak), 1440, 1353, 1200, 1129, 1074, 1035, 960, 904, 869 cm⁻¹.

The above-described bromo derivative was dissolved in 200 ml of acetone, to this solution 19.6 g (0.2 mol) of potassiumacetate was added and the mixture was stirred for 10 minutes at 55°–58°C. After this stirring period the mixture was filtered and the filtrate dried by evaportion under reduced pressure. The residue was dissolved in 300 ml aqueous N.hydrochloric acid solution and stirred at room temperature for 18 h and the title compound was isolated in a manner as described above (yield = 2.9 g; 25% m.p. 126°–128°C). In the mother liquor the 4-acetoxy derivative could be detected and isolated by preparative gaschromatography.

EXAMPLE 29

Preparation of 4-thioacetoxy-2-methyl-5-ethyl-2,3-dihydrofuran-3-one

According to the procedure described in Example 1, a quantity of 96 g (42%) of 2-tetrahydropyranyloxy-3,5-heptanedione; b.p. 83°C/0.02 mm Hg, $n_D^{20}$ = 1.4754 was prepared from 202 g of pyranylether of ethyl lactate and 144 g of butane-2-one.

Into a stirred solution of 11.4 g (0.05 mol) of 2-tetrahydropyranyloxy-3,5-heptanedione and 12.0 g (0.15 mol) of pyridine in 40 ml of dry tetrachloromethane was introduced 3.6 g (0.05 mol of chlorine at 10°C.

The mass spectrum of the so obtained 4-chloro-2-tetrahydropyranyloxy-3,5-heptanedione showed peaks at m/e 85, 43, 41, 57, 55, 67, 45, 86, 84, 56.

Infrared absorption characteristics (in CCl₄): 2940, 2870, 2850, 1725 (broad), 1590 (broad) 1450, 1440, 1199, 1120, 1073, 1031, 1020, 972, 890, 870 cm⁻¹.

NMR in CCl₄. Trimethylsilane as internal standard:

$\delta$=1.03 p.p.m. triplet .................... CH₃—CH₂—

$\delta$=1.17 p.p.m. doublet
$\delta$=1.27 p.p.m. doublet
$\delta$=1.36 p.p.m. doublet
$\delta$=1.41 p.p.m. doublet $\delta$=1.57 p.p.m. multiplet $\delta$=2.64 p.p.m. quartet .................... CH₃—CH₂—C(=O)—

$\delta$=3.1–4.0 p.p.m. multiplet

| | |
|---|---|
| δ=4.0–4.5 p.p.m. multiplet | O—<br>H₃C—C—<br>H |
| δ=4.5–4.8 p.p.m. multiplet | (tetrahydropyranyl O–CH–O ring) |
| δ=5.04 p.p.m. singlet<br>δ=5.24 p.p.m. singlet<br>δ=5.32 p.p.m. singlet | O Cl O<br>‖ ‖ ‖<br>—C—C—C—<br>H |

To the reaction mixture containing the chloro compound was then added under stirring and cooling 4.56 g (0.06 mol) of thioacetic acid. Upon completion of the addition the reaction mixture was stirred for another hour at room temperature, filtered and worked up as described above. Distillation of the residue yielded 3.95 g (40%) of -thioacetoxy-2-methyl-5-ethyl-2,3-dihydrofuran-3-one with b.p. 82°C/ 0.1 mm Hg, $n_D^{20} = 1.5168$.

Nuclear magnetic resonance date (CCl₄) solution trimethyl silane as internal standard $\delta$ = 1.21 ppm triplet CH₃—CH₂—
1.46 ppm doublet CH₃— on 2-position
2.35 ppm singlet CH₃— from acetyl group
2.59 ppm quartet CH₃—CH₂
4.62 ppm quartet H on 2-position Infrared absorption characteristics maxima at (in CCl₄) 2983, 2942, 2935, 2880, 1710, 1675, 1581, 1462, 1448, 1441, 1430, 1387, 1369, 1360, 1352, 1312, 1280, 1246, 1198, 1160, 1130, 1108, 1085, 1060, 1040, 1016, 947, 912, 862, 655, 611, 546, 516, 467, 412 CM-1.

Mass spectral data

| | | | |
|---|---|---|---|
| m/e | 159 (9,5 0/0) | 85 | (8) |
| | 158 (95) | 57 | (100) |
| | 143 (10) | 45 | (20) |
| | 102 (43) | 43 | (97) |
| | 101 (45) | 42 | (11) |

EXAMPLE 30

Preparation of a mixture of
4-acetoxy-2-methyl-5-ethyl-2,3-dihydrofuran-3-one,4-hydroxy-2-methyl-5-ethyl-2,3-dihydrofuran-3-one and
4-hydroxy-5-methyl-2-ethyl-2,3-dihydrofuran-3-one 11.4 g (0.05 mole) of 2-tetrahydropyranyloxy-3,5-heptanedione was brominated with 8.9 g (0.05 mole) of N-bromosuccinimide according to the procedure described above. The resulting 4-bromo-2-tetrahydropyranyloxy-3,5-heptanedione showed infrared absorption characteristic maxima in CCl₄ at: 2940, 2870, 2850, 1740 1716 (br), 1450, 1439, 1199, 1122, 1072, 1032, 964, 870 cm⁻¹. Mass data m/e 85, 57, 43, 41, 55, 45, 67, 86, 99, 56. NMR in CCl₄ (with trimethylsilane as an internal standard.

| | |
|---|---|
| δ=1.09 p.p.m. triplet | CH₃—CH₂ |
| δ=1.0–1.5 p.p.m. multiplet | O<br>‖<br>CH₃—C—<br>H |
| δ=1.56 p.p.m. multiplet | 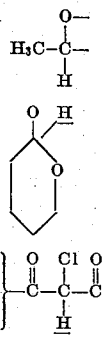 |
| δ=2.70 p.p.m. quartet | CH₃—CH₂— |
| δ=3.2–4.0 p.p.m. multiplet | (pyranyl ring) |
| δ=4.19 p.p.m. quartet<br>δ=4.22 p.p.m. quartet | O—<br>H₃C—C<br>H C—<br>‖<br>O |
| δ=4.5–5.0 p.p.m. multiplet | O H<br>(ring) |
| δ=5.12 p.p.m. singlet<br>δ=5.31 p.p.m. singlet<br>δ=5.43 p.p.m. singlet | Br<br>‖ ‖ ‖<br>—C—C—C—<br>O H O |

The above-prepared bromo compound was treated with 9.8 g (0.1 mole) of potassium acetate in 100 ml of acetone as described above. After working up, the residue was stirred with 200 ml 0.25 N HCl solution at 80°C for 1 hour. The aqueous reaction mixture was continuously extracted with ether for 18 hours. The ether extract was dried and evaporated and the residue was found to contain a 2:7:3 mixture of the title compounds. From this mixture 4-acetoxy-2-methyl-5-ethyl-2,3-dihydrofuran-3-one could be isolated by preparative gaschromatography. Mass-spectrum data: m/e 184 (5), 142 (83), 127 (2.5), 99 (3), 85 (20), 57 (100), 43 (53). Infrared absorption characteristics (in CCl₄) 1784, 1720, 1640, 1195 cm⁻¹.

A 70/30 mixture of 4-hydroxy-2-methyl-5-ethyl-2,3-dihydrofuran-3-one and 4-hydroxy-2-ethyl-5-methyl-2,3-dihydrofuran-3-one could be isolated by distillation (yield 41%, b.p. 65°/0.01 mm Hg). The mass-spectrum of this mixture showed the peaks at m/e 142 (66), 127 (10), 99 (18), 71 (42), 57 (97), 43 (100).

EXAMPLE 31

Preparation of
4-hydroxy-2,5-dimethyl-2,3-dihydrofuran-3-one

To a mixture of 118 g (1 mole) of ethyllactate and 1.0 g of dry HCl was added in the course of 1 hour at 30°C 64 g (1.1 mol) of methylvinyl ether. The mixture was then stirred for 30 minutes and distilled through a 30 cm Vigreux column. The yield was 130 g (74%) of 2-O-(alphamethoxyethyl)-ethylactate with b.p. 55°C at 7 mm Hg.

36.25 g (0.625 mole) of acetone was acylated with 88 g (0.5 mole) of the protected lactic ester above described in 50 ml of dry toluene in the presence of 33.75 g (0.625 mole) of sodium methoxide. After working up the reaction mixture, 50 g (53% of 2-(alphamethoxyethoxy)-3,5-hexanedione was isolated by distillation bp. 55°C at 0.2 mm Hg.

18.8 g of the hexanedione thus prepared was treated with 17.8 g (0.1 mole) of N-bromo succinimide in 100 ml of tetrachloromethane. After evaporating off the solvent the bromocompound was treated with 19.6 g (0.2 mole) of potassium acetate in 200 ml of acetone and the mixture was stirred for 10 minutes at 55°–58°C. After this stirring period the mixture was filtered and the filtrate evaporated under reduced pressure. The residue was dissolved in 200 ml 0.25 N aqueous HCl solution and stirred at 80°C for 45 minutes. From the aqueous solution 4-hydroxy-2,5-dimethyl-2,3-dihydrofuran-3-one was isolated in the usual way, yield 3.3 g = 26% (calculated on 2-(alphamethoxyethoxy)-3,5-hexanedione) with m.p. 79°–81°C.

EXAMPLE 32

Preparation of 4-hydroxy-2,5-dimethyl-2,3-dihydrofuran-3-one

To a solution of 36.5 g (0.21 mole) of t-butylether of ethyllactate [prepared according to the method described by F. M. Callahan et al., J.AM.Chem.Soc. 85, 201 (1963)] in 200 ml of dry ether was added 22.8g(0.42 moles) of sodium methoxide. Acetone (24.4 g = 0.42 moles) was then added and the reaction mixture was refluxed for 30 minutes. After working up 2-tert-butyloxy-3,5-hexanedione was isolated by destillation, bp. 60°–61°C at 2.5 mm Hg, $n_D^{20}$ =1.4539.

18.6 g (0.1 mole) of 2-tert-butyloxy-3,5-hexanedione was brominated with 17.8 g (0.1 mole) of N.bromosuccinimide according to the procedure described above and the resulting 4-bromo-2-tert-butyloxy-3,5-hexanedione was treated with 19.6 g (0.2 mole) of potassium acetate in 200 ml of acetone. After working up, the residue was stirred with 400 ml 0.25 N HCl solution at 80°C for 45 minutes.

Extraction of the aqueous acidic solution with ether and crystallisation of the evaporated ether extract afforded 6.0 g = 47% (calculated on 2-tert.-butyloxy-3,5-hexanedione) of 4-hydroxy-2,5-dimethyl-2,3-dihydrofuran-3-one, mp- 79°–80°C.

EXAMPLE 33

Preparation of 4-hydroxy-2,5-dimethyl-2,3-dihydrofuran-3-one

To a stirred mixture of 118 g (1.0 mole) of ethyllactate and 0.5 g of KHSO$_4$ was added in 20 minutes at 40°C 79 g (1.1 mole) of ethylvinylether. Stirring was continued for another 30 min. and the reaction mixture was destilled through a 30 cm Vigreux-column. The product with bp. 68°C at 4 mm Hg was collected, which proved to be pure 2-0-(alpha-ethoxyethyl)-ethyllactate. Yield 180 g = 95%, $n_D^{20}$ = 1.4098. 58 g (1.0 mole) of acetone was acylated with 152 g (0.8 mole) of the above prepared protected lactic ester in 100 ml of dry toluene in the presence of 40 g (1.0 mole) of sodium methoxide. The reaction mixture was worked up according to the procedure described above. and 130 g (80%) of 2-(alpha-ethoxyethoxy)-3,5-hexanedione was isolated by distillation bp. 68°C at 0.2 mm Hg $n_D^{20}$ = 1.4483.

To a stirred mixture of 50.5 g (0.25 mole) of the above prepared hexanedione, 120 ml of dimethylformamide and 58.8 g (0.6 mole) of potassium acetate at 20°–25°C, was added in 1 hour 41.0 g (0.255 mole) of bromine. After stirring for 1 hour, the reaction mixture was poured into 200 ml of ice-water, and the resulting mixture was extracted five times with 100 ml of n-pentane. The combined pentane extract was washed with 50 ml of water, evaporated and the resulting residue was dissolved in 150 ml of a 3% aqueous oxalic acid solution and refluxed for 1 hour. From this solution 4-hydroxy-2,5-dimethyl-2,3-dihydrofuran-3-one was isolated in a manner as described earlier. Yield: 12.9 g = 41% (calculated on 2-O-(alpha-ethoxy ethyl)-3,5-hexanedione) with mp. 78°–80°C.

EXAMPLE 34

Preparation of 4-hydroxy-2,5-dimethyl-2,3-dihydrofuran-3-one

A mixture of 29.2 g (0.2 mol) of alpha-ethoxyethyl-propionate[prepared according to the method described by A. A. Petrov, et al. Zhur Obshekei Khim. 23, 737 (1953)] and 23,2 g (0.4 mol) of acetone was added in the course of 30 minutes at 20°–25°C to a mixture of 16 g (0.4 mol) of sodium methoxide and 80 ml of dry pentane whilst stirring. Stirring was continued after completing the addition for another 15 minutes at 20°C.

After working up the reaction mixture 2-ethoxy-3,5-hexanedione was isolated by distillation (b.p. 40°C at 0,1 mm Hg. $n_D^{20}$ = 1.4553). Infrared absorption characteristics: maxima at (liquid) 2980, 2940, 2880, 1735, 1715, 1615, 1450, 1370, 1323, 1240, 1170, 1115, 1070, 1030, 945, 885 and 800 cm$^{-1}$.

To a stirred mixture of 15.8g(0.1 mol) of the above prepared hexanedione, 100 ml of dimethylformamide and 29.4 g (0.3 mole of potassiumacetate at 20°–25°C, was added in 30 minutes 16.0 g (0.1 mole) of bromine. After stirring for an hour at room temperature, the reaction mixture was poured into 150 ml of ice-water and the resulting mixture was extracted 5 times with 50 ml pentane portions. The combined pentane extracts were washed with 30 ml of water and evaporated. From the resulting residue 16.2 g = 75% of 2-ethoxy-4-acetoxy-3,5-hexanedione was isolated by distillation (b.p. 62° at 0.1 mm Hg, $n_D^{20}$ = 1.4408). Infrared absorption characteristics: maxima at (OCl$_4$ solution) 2980, 2940, 2880, 1760, 1735, 1728, 1450, 1375, 1232, 1113 and 904 cm$^{-1}$. The mass spectrum showed peaks at m/e 42, 43, 44, 45, 45, 57, 73, 74, 85, 86, 116, 128. NMR (CCl$_4$ solution with trimethylsilane as internal standard).

| | | |
|---|---|---|
| $\delta$= 1.17 ppm triplet | $\delta$= 2.16 ppm singlet | $\delta$= 3.98 ppm quartet |
| = 1.19 ppm triplet | = 2.20 ppm singlet | = 4.09 ppm quartet |
| = 1.27 ppm doublet | = 3.46 ppm quartet | = 5.64 ppm singlet |
| = 1.28 ppm doublet | = 3.49 ppm quartet | = 5.80 ppm singlet |

16.2 g (0.075 mole) of the above prepared 2-ethoxy-4-acetoxy-3,5-hexanedione was added in the course of 15 minutes at 0°–5°C to 50 ml of concentrated sulphuric acid, which was vigorously stirred. Stirring was continued for another 15 minutes at 0°–50°C and then the reaction mixture was poured on 150 g of crushed ice. The aqueous solution so obtained was continuously extracted with ether for 12 hours. The ether extract was dried and evaporated and the residue was crystallized from ether. After standing overnight in the refrigerator the crystals were collected by filtration (6.45 g, 50% yield calculated on 2-ethoxy-3,5-hexanedione), mp. 77°–78°C, and proved to be pure 4-hdyroxy-2,5-dimethyl-2,3-dihydrofuran-3-one, when examined by Gas Liquid Chromatography.

EXAMPLE 35

Preparation of
4-hydroxy-2,5-dimethyl-2,3-dihydrofuran-3-one 20.2 g (0.1 mole) of 2-(alpha-ethoxyethoxy)-3,5-hexanedione was brominated with 17.8 g (0.1 mole) of N-bromosuccinimide according to the procedure described earlier. The resulting 4-bromo-2-(alpha-ethoxyethoxy)-3,5-hexanedione showed infrared absorption characteristic maxima in $CCl_4$ at: 2980, 2940, 2900, 1750, 1725, 1450, 1390, 1360, 1100 1082, 950, and 856 $cm^{-1}$. NMR in $CCl_4$ (with trimethylsilane as an internal standard).

| | |
|---|---|
| $\delta$= 1.17 ppm triplet<br>= 1.30 ppm doublet<br>= 1.40 ppm doublet<br>= 1.50 ppm doublet | $\delta$= 2.38 ppm singlet<br>= 2.40 ppm singlet<br>= 2.50 ppm singlet<br>= 2.55 ppm singlet |
| $\delta$= 3.55 ppm multiplet<br>= 4.20 ppm quartet<br>= 4.75 ppm quartet | $\delta$= 5.20 ppm singlet<br>= 5.26 ppm singlet<br>= 5.37 ppm singlet<br>= 5.50 ppm singlet |

The above prepared bromo compound was treated with 19.6 g (0.2 mole) of potassium acetate in 200 ml of acetone as described above. After working up, the reaction product was stirred with 200 ml of an aqueous 4% oxalic acid solution for 1 hour.

The aqueous reaction mixture was extracted 5 times with 40 ml portions of dichloromethane. The combined extracts wee dried and evaporated and the residue was crystallised from 50 ml of diethyl ether. The title compound (yield = 5.0 g 39%) with mp. 78°–80°C was isolated in the usual way.

EXAMPLE 36

Preparation of
4-hydroxy-2,5-dimethyl-2,3-dihdyrofuran-3-one

A mixture of 20,8 g (0.1 mole) alpha-benzyloxyethyl-propionate [prepared according to the method described by K. Mislow et al. J.Am.Chem.Soc. 84, 1940–4 (1962)] and 11,6 g (0.2 mole) of acetone was added in the course of 30 minutes at 10°–15°C (ice-bath) to a stirring mixture 8.0 g (0.2 mol) of sodium-methoxide and 40 ml of dry pentane. Stirring was continued after completing the addition for another 30 minutes at 5°C. After working up the reaction mixture 2-benzyloxy-3,5-hexanedione was isolated by destillation (b.p 92°C at 0.05 mm Hg $n_D^{20}$ = 1.5252). Infrared absorption characteristics: maxima at ($CCl_4$ solution). 3090, 3070, 3040, 2990, 2940, 2870, 1610 (S, br.), 1502, 1458, 1373, 1335, 1240, 1165, 1111 (s), 1058, 1031, and 697 $cm^{-1}$.

The mass spectrum showed peaks at m/e 43, 51, 58, 65, 77, 85, 91, 92, 114, 118, 135.

NMR ($CCl_4$ solution with trimethylsiliane as internal standard).

| | |
|---|---|
| $\delta$= 1.40 ppm doublet<br>= 2.05 ppm singlet<br>= 3.88 ppm quartet<br>= 4.45 ppm doublet | $\delta$= 4.55 ppm doublet<br>= 5.85 ppm singlet<br>= 7.27 ppm singlet |

17.6 g (0.08 mol) of the above prepared 2-benzyloxy-3,5-hexanedione was dissolved in 80 ml of dimethyl formamide and to this solution was added 24 g (0.24 mol) of potassiumacetate. To the mixture so obtained was added in the course of 1 hour at 20°–22°C 12,8 g (0.08 mol) of bromine. After stirring for one hour at the same temperature, the reaction mixture was poured into 160 ml of water and this solution was extracted five times with 40 ml pentane portions. The combined pentane extracts were washed with water, dried and evaporated. The resulting residue proved to be pure 2-benzyloxy-4-acetoxy-3,5-hexanedione.

Infrared absorption characteristics maxima at ($CCl_4$ solution) 3090, 3060, 3040, 2990, 2940, 2880, 1765, 1750, 1730, 1610, 1502, 1458, 1373, 1361, 1230, 1208, 1165, 1110, 1030, 982, 903 and 696 $cm^{-1}$. The mass spectrum showed peaks at: m/e 43, 51, 65, 77, 91, 101, 135, 146, 164, 206, 235.

NMR ($CCl_4$ solution with trimethylsilane as an internal standard)

| | |
|---|---|
| $\delta$ = 1.33 ppm doublet<br>= 1.35 ppm doublet<br>= 2.02 ppm singlet<br>= 2.15 ppm singlet<br>= 2.18 ppm singlet | $\delta$ = 4.06 ppm quartet<br>= 4.15 ppm quartet<br>= 4.40 ppm quartet<br>= 4.50 ppm singlet<br>= 5.70 ppm singlet<br>= 5.85 ppm singlet<br>= 7.30 ppm singlet |

13.9 g (0.05 mole) of the above prepared 2-benzyloxy-4-acetoxy-3,5-hexanedione was added at 0°C to 28 ml of concentrated sulphuric acid, which was vigorously stirred. After a 10 minutes reaction period the mixture was poured on to 100 g of crushed ice. The title compound was isolated from the aqueous solution in the usual way. Yield 2,6 g = 41.0% (calculated on 2-benzyloxy-4-acetoxy3,5-hexanedione) with mp. 78°–80°C.

EXAMPLE 37

0.1 g of 4-acetoxy-2-tetrahydropyranyloxy-3,5-hexanedione (prepared according to Ex. 3) was added to a mixture of 10 g of hydrogenated vegetable fat and 0.1 ml of water and the mixture was heated to 140°C for 5 minutes. After cooling the fat thus obtained was compared with a sample to which no 4-acetoxy-2-tetrahydropyranyloxy-3,5-hexanedione had been added. The heated product to which the diketone had been added was generally preferred because of its flavour which was reminiscent of 2,5-dimethyl-4-hydroxyfuran-3-one.

What is claimed is:

1. A method for the preparation of a substituted 2,3-dihydrofuran-3-one of the structure

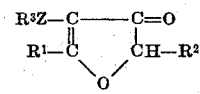

or a tautomeric structure thereof in which
- Z represents an oxygen or sulphur atom
- $R^1$ and $R^2$ represent hydrogen or lower hydrocarbyl groups with the proviso that the number of carbon atoms of $R^1$ and $R^2$ taken together is from 1-4.
- $R^3$ represents a hydrogen, acyl derived from carboxylic acid, or alkyl group containing 1-24 carbon atoms comprising reacting in the presence of an acid a diketone of the general formula

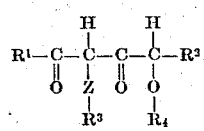

or a tautomeric structure thereof in which $R^1$, $R^2$, and $R^3$ and Z represent groups indicated above and $R^4$ represents an alcohol protecting group resistant to alkali but removable under acid reaction conditions selected from the class consisting of a $C^1$-$C^{20}$ alkyl group, 2-tetrahydrofuranyl group, 2-tetrahydropyranyl group, a methoxyethyl or ethoxyethyl group, or an α- or β- unsaturated group selected from an allyl, benzyl, or a meta- or para-methoxy phenyl.

2. A method according to claim 1 in which $R^1$ and $R^2$ each represent an alkyl group.

3. A method according to claim 1 in which $R^3$ represents an alkyl group containing 1-4 carbon atoms.

4. A method according to claim 2 in which $R^3$ represents an alkyl group containing 1-4 carbon atoms.

5. A method according to claim 1, in which the acid is an optionally substituted $C_1$-$C_8$ mono-, di-, or tricarboxylic, or thiocarboxylic acid, an inorganic acid or a so-called aprotic Lewis acid.

6. A method according to claim 1, in which the reaction is carried out at a temperature ranging from −30° to 150°C.

7. A method according to claim 1, in which the reaction time ranges between several minutes and a few hours.

* * * * *